United States Patent [19]
Taniguchi et al.

[11] Patent Number: 5,470,284
[45] Date of Patent: Nov. 28, 1995

[54] AUTOMATIC TRANSMISSION

[75] Inventors: Takao Taniguchi, Okazaki; Kazumasa Tsukamoto, Toyota; Masahiro Hayabuchi, Anjo; Satoru Kasuya, Hekinan; Nobutada Sugiura, Nishio; Masaaki Nishida, Anjo, all of Japan

[73] Assignee: Aisin AW Co., Ltd., Japan

[21] Appl. No.: 269,059

[22] Filed: Jun. 30, 1994

[30] Foreign Application Priority Data

Jun. 30, 1993 [JP] Japan .................................... 5-187432

[51] Int. Cl.$^6$ .................................................. F16H 3/44
[52] U.S. Cl. .......................... 475/204; 475/206; 475/281
[58] Field of Search .................................. 475/204, 206, 475/281

[56] References Cited

U.S. PATENT DOCUMENTS

| | | |
|---|---|---|
| 4,624,154 | 11/1986 | Kraft et al. . |
| 4,722,242 | 2/1988 | Miura et al. . |
| 4,914,978 | 4/1990 | Moroto et al. . |
| 5,006,102 | 4/1991 | Takase et al. . |

FOREIGN PATENT DOCUMENTS

| | | |
|---|---|---|
| 2191672 | 6/1973 | France . |
| 4230462 | 11/1992 | Germany . |

*Primary Examiner*—Dirk Wright
*Attorney, Agent, or Firm*—Lorusso & Loud

[57] ABSTRACT

An automatic transmission for five forward speeds equipped with a main transmission mechanism and an auxiliary transmission mechanism. The auxiliary transmission mechanism includes a multi-disc clutch and a hydraulic servo therefor arranged in a first planetary gear set. The first planetary gear set includes a first ring gear connected to an output unit of the main transmission mechanism and a first carrier connected to an output shaft and further to a first sun gear through a multi-disc clutch and a hydraulic servo for the former. The hydraulic servo for the multi-disc clutch is connected to an integral casing through a band brake and is arranged around the outer circumference of the hydraulic servo for the multi-disc clutch. A second planetary gear set is arranged on the hydraulic servo for the multi-disc clutch and includes a second ring gear connected to the output shaft, a second carrier connected to the integral casing through a multi-disc brake and a second sun gear connected to the first sun gear through the cylinder of a hydraulic servo for the multi-disc clutch. The rear casing forms part of the cylinder of the hydraulic servo for the multi-disc brake. The auxiliary transmission mechanism has a compact three-speed construction to provide five forward speeds in cooperation with the main transmission mechanism. The five-speed automatic transmission can be easily modified merely by removing the second planetary gear set and the brake for the 1st speed to provide a four-speed transmission at a reasonable cost due to the sharing of parts in common.

6 Claims, 4 Drawing Sheets

| | C1 | C2 | C3 | B1 | B2 | B3 | B4 | F1 | F2 | F3 |
|---|---|---|---|---|---|---|---|---|---|---|
| 1ST | O | | | | | ◌ | ◌ | | O | O |
| 2ND | O | | | ◌ | O | | ◌ | O | | O |
| 3RD | O | | O | ◌ | O | | | O | | |
| 4TH | O | O | O | | | | | | | |
| REV | | O | | | | O | O | | | |

◌ : at Engine Braking Time

|  | C1 | C2 | C3 | B1 | B2 | B3 | B4 | B5 | F1 | F2 | F3 |
|---|---|---|---|---|---|---|---|---|---|---|---|
| 1ST | ○ |  |  |  |  | ◌ |  | ◌ | ○ | ○ |  |
| 2ND | ○ |  |  | ◌ | ○ |  |  | ◌ | ○ |  | ○ |
| 3RD | ○ |  |  | ◌ | ○ |  | ○ |  | ○ |  |  |
| 4TH | ○ |  | ○ | ◌ | ○ |  |  |  | ○ |  |  |
| 5TH | ○ | ○ | ○ |  |  |  |  |  |  |  |  |
| REV |  | ○ |  |  |  | ○ |  | ○ |  |  |  |

◌ : at Engine Braking Time

AUTOMATIC TRANSMISSION

BACKGROUND OF THE INVENTION

1. Field of the Invention

The present invention relates to an automatic transmission having a planetary gear unit especially suitable for application to an FF (i.e., Front-engine Front drive type) automobile and, more particularly, to a five-speed automatic transmission, which can be converted to a four-speed automatic transmission by a slight change.

2. Description of the Related Art

Generally speaking, a four-speed transmission combines an auxiliary transmission section having one planetary gear mechanism and a main transmission section having two planetary gear units to establish four forward speeds and one rear speed. The application of this type automatic transmission to a FF automobile is shown, for example, in our U.S. Pat. No. 4,722,242 which discloses a four-speed automatic transmission, which combines a three-speed automatic transmission mechanism, having two planetary gear units, and an under drive (UD) mechanism, having a single planetary gear unit.

In recent years demand for improvements in mileage and running performance has led to development of transmissions with five forward speeds. One such automatic transmission including, arranged on a first shaft, a main transmission mechanism, having a combination of a single planetary gear set and a dual planetary gear set, and arranged on a second shaft, a Simpson type auxiliary transmission mechanism, as disclosed in our prior pat U.S. Pat. No. 4,914,978. Thus, the main transmission mechanism can establish three or four forward speeds and is combined with a three-speed auxiliary transmission mechanism to establish five or six forward speeds for the automatic transmission as a whole (hereinafter the "multi-speed" automatic transmission A).

Many types of automatic transmissions are required to meet the needs of different vehicles and different preferences. It would lead to a drastic increase in production cost if such various kinds of automatic transmissions were to require correspondingly different parts and different assembly lines. Hence, it is an important consideration in the manufacture of automatic transmissions that the various parts and the various assembly lines should be interchangeable for different transmissions. The capability to modify a four-speed automatic transmission into a five-speed one is conventional.

In the aforementioned multi-speed automatic transmission A, the auxiliary transmission mechanism has its two planetary gear sets connected by a connecting member and has, at its rear (near the engine), a 2nd-speed brake and a 3rd-speed clutch. As a result, the number of parts which can be shared with the four-speed automatic transmission, equipped with the auxiliary transmission mechanism having a single planetary gear set, is so few that the brakes, clutches and so on have to be changed into different arrangements and connections, as between the four- and five-speed automatic transmissions, thus requiring drastic changes in assembly lines. Thus, the multi-speed automatic transmission A encounters the problem of high production cost.

When the automatic transmission has multiple speeds, moreover, a wider range of gear ratios can provide the advantage that a higher torque can be achieved at lower-speed gear stages to improve the acceleration of the vehicle. On the other hand, the frictional engagement elements which engage at the lower speeds are exposed to higher loads so that they require enhanced durability. Such frictional engagement elements are typically multi-disc engagement elements having higher torque capacities. However, the multi-disc engagement elements must have many frictional members and hydraulic servos acting axially. Thus, the multi-disc engagement elements cause an increase in axial dimension of the automatic transmission so that they cannot always be advantageously used in the FF automatic transmission which is limited with regard to permissible axial length.

In the auxiliary transmission mechanism of the aforementioned multi-speed automatic transmission A, band brakes are used as the frictional engagement elements to be engaged in lower-speed gear stages, e.g. for 1st speed and reverse, so as to minimize increase in the axial length. With a view to increasing the torque capacity, however, the band brakes are longer than conventional band brakes. Thus, the use of band brakes does not adequately serve the purpose for which they were adopted, i.e. to reduce dimensions of the transmission.

Therefore, there has been proposed a multi-speed automatic transmission (hereinafter "multi-speed automatic transmission B") having a Simpson type auxiliary transmission mechanism with multi-disc brakes, as disclosed in U.S. Pat. No. 4,624,154. In this multi-speed automatic transmission B, the frictional engagement elements which engage in the higher-speed gear stages with relatively lower load are band brakes, whereas the frictional engagement elements which engage at a lower speed gear stage under higher load are multi-disc brakes having higher torque capacities.

In the aforementioned multi-speed automatic transmission B, however, the auxiliary transmission mechanism must have an axial dimension sufficient to accommodate hydraulic servos for applying and releasing the multi-disc brakes, as described above. At the same time, the parts are not interchangeable with (shared in common with) a four-speed automatic transmission, e.g. the foregoing multi-speed automatic transmission A, because the two planetary gear sets are connected by the connecting member and have the multi-disc brakes and the direct drive clutches at the engine end. Therefore, there remain serious unsolved problems such as lack of a feasibly short axial length and remarkably high cost.

SUMMARY OF THE INVENTION

Therefore, an object of the present invention is to solve the problems explained above and to provide a five-speed automatic transmission in which an auxiliary transmission mechanism, arranged about a second shaft, has a compact three-speed structure which is practical for mounting on a vehicle although it has multi-disc brakes of large torque capacity. Another object is to provide such a transmission which has parts easily shared with a four-speed automatic transmission to reduce production cost.

Thus, the present invention provides an automatic transmission including a fluid coupling and a main transmission mechanism arranged coaxially with each other on a first shaft, with the main transmission mechanism being capable of establishing three forward speeds and one reverse speed. The main transmission mechanism includes a planetary gear train coupled to the fluid coupling, and an output unit connected to the planetary gear train and arranged between the planetary gear train and the fluid coupling.

The automatic transmission of the present invention further includes an auxiliary transmission mechanism arranged on a second shaft, parallel to the first shaft, for establishing three forward speeds and including an output shaft, first and second planetary gear sets and a plurality of frictional engagement elements. The frictional engagement elements include a multi-disc clutch which is engaged at the 3rd speed of the auxiliary transmission mechanism, with a hydraulic servo for operating same, a band brake which is engaged at 2nd speed of the auxiliary transmission mechanism and a multi-disc brake which engages at 1st speed of the auxiliary transmission mechanism, with a hydraulic servo for operating same. The first planetary gear set includes a first ring gear connected to the output unit of the main transmission mechanism, thus acting as an input unit for the auxiliary transmission mechanism, a first carrier connected to the output shaft and a first sun gear connected to the first carrier through operation of the multi-disc clutch. The multi-disc clutch and the hydraulic servo for the multi-disc clutch are located at the axial end near the rear casing, coaxial with said first planetary gear set, and connect to the integral casing unit through the band brake. The band brake, in turn, is arranged around the outer circumference of the hydraulic servo for the multi-disc clutch. The second planetary gear set includes a second ring gear arranged at the axial end near the rear casing, coaxial with the multi-disc clutch, and its hydraulic servo, and connected to the output shaft. A second carrier connects to the integral casing unit through the multi-disc clutch and a second sun gear connects to said first sun gear through the hydraulic servo for the multi-disc clutch.

A housing which accommodates the fluid coupling is joined to a casing for accommodating both the main transmission mechanism and the auxiliary transmission mechanism. A rear cover is joined to the casing, forming an integral casing unit together with the housing and the casing. The rear cover forms part of teh hydraulic servo for the multi-disc brake.

The automatic transmission according to the present invention operates according to the chart of FIG. 4, for example, to establish five forward speeds and one reverse speed. A four-speed automatic transmission can be constructed by removing the second planetary gear set and the 1st-speed brake from the auxiliary transmission mechanism of the five-speed automatic transmission. The four-speed automatic transmission operates according to the chart of FIG. 2, for example, to establish four forward speeds and one reverse speed.

In the automatic transmission according to the present invention, moreover, the auxiliary transmission mechanism arranged on the second shaft has its first planetary gear set, 3rd-speed clutch and 2nd-speed brake arranged and connected as in the auxiliary transmission mechanism, having one planetary gear set, of the four-speed automatic transmission of the prior art. The second planetary gear set and the 1st-speed brake are added to the back thereof (opposed to the engine) so that gear stages for three forward speeds may be established by applying and releasing the clutch and the two brakes selectively and so that the auxiliary transmission mechanism may be combined with the main transmission mechanism to establish five forward speeds. As a result, a four-speed automatic transmission can be easily constructed merely by removing the second planetary gear set and the 1st speed brake. In other words, most of the parts can be shared, and the four- and five-speed automatic transmissions can be produced without any substantial change in the existing assembly lines so that the five-speed automatic transmission can be produced without any increase in the production cost.

In the auxiliary transmission mechanism, its 2nd-speed brake is a band brake, its 1st-speed brake is a multi-disc brake and its hydraulic servo is partially formed by the rear cover. The axial size of the auxiliary transmission mechanism can be prevented from exceeding that of the main transmission mechanism by using the multi-disc brake having a high torque capacity as a frictional engagement element to be engaged at a lower-speed gear stage under a high load, so that a five-speed automatic transmission can be provided while retaining mounting feasibility in terms of axial length.

DESCRIPTION OF THE PREFERRED EMBODIMENT

Figures 1, 2:
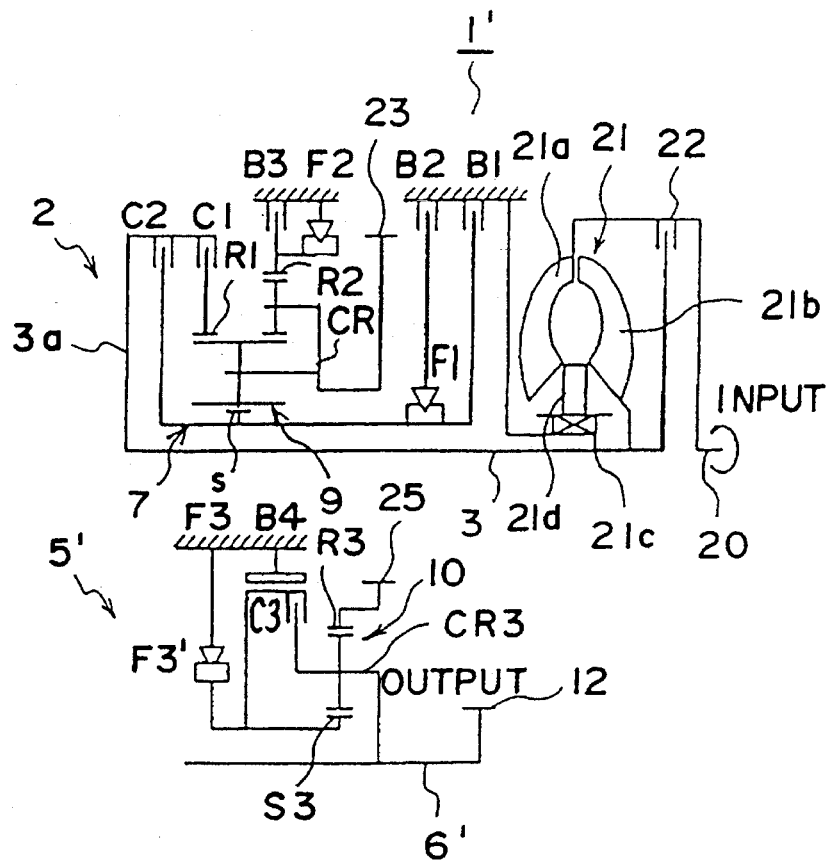
FIG. 1 is a schematic diagram showing a four-speed automatic transmission.
FIG. 2 is a chart tabulating the operations of frictional engagement elements of the four-speed automatic transmission.

FIG. 1 shows a four-speed automatic transmission, generally designated 1', including a first shaft 3 aligned with an engine output shaft 20 and a second shaft 6' arranged in parallel with the first shaft 3. The first shaft 3 connects a torque converter 21 and a main transmission mechanism 2, whereas the second shaft 6' is arranged with an auxiliary transmission mechanism 5'. The torque converter 21 includes an impeller 21a connected to the engine output shaft 20, a turbine 21b connected to the input shaft 3 of the main transmission mechanism 5, i.e. the "first shaft," and a stator 21d supported through a one-way clutch 21c. The rotation of the engine output shaft 20 is transmitted to the input shaft 3 either hydraulically through the torque converter 21 or mechanically by engagement of a lock-up clutch 22.

The main transmission mechanism 2 includes a planetary gear unit including a single planetary gear set 7 and a dual planetary gear set 9. This gear unit has its sun gear S and carrier CR shared by the two planetary gear sets 7 and 9. The input shaft 3 is connected through a forward (or first) clutch C1 to a ring gear R1 of the single planetary gear set 7 and through a direct (or second) clutch C2 to a sun gear S. A counter drive gear 23, serving as the output of the main transmission mechanism 2, is connected to the carrier CR. The sun gear S is braked by a first brake B1 and braked in the forward drive (i.e., engine→wheels) and forward rotation by a second brake B2 and a first one-way clutch F1. The dual planetary gear set 9 has its ring gear R2 braked by a third brake B3 and is braked in forward drive and forward rotation by a second one-way clutch F2.

The auxiliary transmission mechanism 5' includes one (or "first") single planetary gear set 10. A counter driven gear 25 is meshed with the aforementioned counter drive gear 23 to provide an input for the auxiliary transmission mechanism 5' and is connected to a ring gear R3 of the planetary gear set 10. A gear 12, connected to the differential mechanism to provide an output, is connected to a carrier CR3. Moreover, this carrier CR3 and a sun gear S3 are interconnected through an underdrive (UD) direct (or third) clutch C3, and the sun gear S3 is braked by a fourth brake B4 and, in forward drive and forward rotation, by a third one-way clutch F3'.

As described above, the main transmission mechanism 2 establishes three forward speeds and one reverse speed by itself whereas the auxiliary transmission mechanism 5' establishes two underdrive and direct drive speeds so that the entire automatic transmission 1' operates, as shown in FIG. 2, to provide four forward speeds and one reverse speed.

In first (1ST) speed, the forward clutch C1 is engaged, and the second and third one-way clutches F2 and F3 are engaged to hold the ring gear R2, of the dual planetary gear set, and the sun gear S3, of the UD planetary gear set, against rotation. In this state, the rotation of the input shaft 3 is transmitted through the forward clutch C1 to the ring gear R1 of the single planetary gear set. At the same time, the ring gear R2 of the dual planetary gear set is locked against rotation so that the common carrier CR is drastically decelerated in the forward direction while rotating the sun gear S idly in the reverse direction. This decelerated rotation is transmitted through the counter drive gear 23 and the driven gear 25 to the ring gear R3 of the UD planetary gear set. Since, at this time, the sun gear S3 does not rotate, the rotation is further decelerated by the auxiliary transmission mechanism 5' so that 1st speed rotation is output from the carrier CR3 to the output gear 12.

In second (2ND) speed, not only the forward clutch C1 but also the second brake B2 engage, and engagement is switched from the second one-way clutch F2 to the first one-way clutch F1. At the same time, the third one-way clutch F3 remains engaged. In this state, the common sun gear S is braked by the second brake B2 and the first one-way clutch F1 so that the rotation of the ring gear R1 of the single planetary gear set transmitted from the input shaft 3 to the forward clutch C1 decelerates the carrier CR in the forward direction while rotating the ring gear R2 of the dual planetary gear set idly in the forward direction. This decelerated rotation is transmitted through the counter gears 23 and 25 and the auxiliary transmission mechanism 5' in underdrive to the output gear 12 so that 2nd speed rotation is output.

In third (3rd) speed, the forward clutch C1, the second brake B2 and the first one-way clutch F1 remain engaged, and the third one-way clutch F3 is released, whereas the UD direct clutch C is engaged. Specifically, the main transmission mechanism 2 remains as it was in 2nd speed, and the aforementioned 2nd speed rotation is transmitted to the counter driven gear 25. In the auxiliary transmission mechanism 5', moreover the UD direct clutch C3 is engaged to integrate the UD planetary gear set 10 so that the rotation of the aforementioned driven gear 25 is output as is from the output gear 12.

In fourth (4TH) speed, not only the forward clutch C1 and the UD direct clutch C3 but also the direct clutch C2 are engaged. In this state, the rotation of the input shaft 3 is transmitted to the ring gear R1 of the single planetary gear set and to the common sun gear S so that the gear unit composed of the single and dual planetary gear sets 7 and 9 is integrally rotated to transmit direct drive rotation to the counter drive gear 23. Moreover, the auxiliary transmission mechanism 5' is also in a direct drive state so that the direct drive rotation of the gear 23 is output as is from the output gear 12.

In reverse (REV), the direct clutch C2, the third brake B3, and the fourth brake B4 are engaged. In this state, the rotation of the input shaft 3 is transmitted through the direct clutch C2 to the sun gear S. Since, at this time, the ring gear R2 of the dual planetary gear set is braked by the third brake B3, the carrier CR is reverse rotated while the ring gear R1 of the single planetary gear set is rotated idly backward. This reverse rotation is transmitted through the counter gears 23 and 25 to the ring gear R2 of the dual, planetary gear set. In the UD planetary gear set 10, the sun gear S is braked in the reverse direction, too, by the fourth brake B4 so that the rotation of the ring gear R3 is output as decelerated reverse rotation from the carrier CR3 to the output gear 12.

Incidentally, those frictional engagement elements indicated by broken circles in FIG. 2, are activated when engine braking is effected. Specifically, in 1st-speed, the third brake B3 and the fourth brake B4 are engaged to hold against rotation the ring gear R2 of the dual planetary gear set and the sun gear S3 of the UD planetary gear set, which might otherwise idly rotate with the second one-way clutch F2 and the third one-way clutch F3. In 2nd-speed, the first brake B1 and the fourth brake B4 are engaged to hold against rotation the common sun gear S and the sun gear S3, which might otherwise idly rotate with the first one-way clutch F1 and the third one-way clutch F3'. In 3rd-speed, the first brake B1 is engaged to hold the common sun gear S against rotation.

Figures 3, 4:
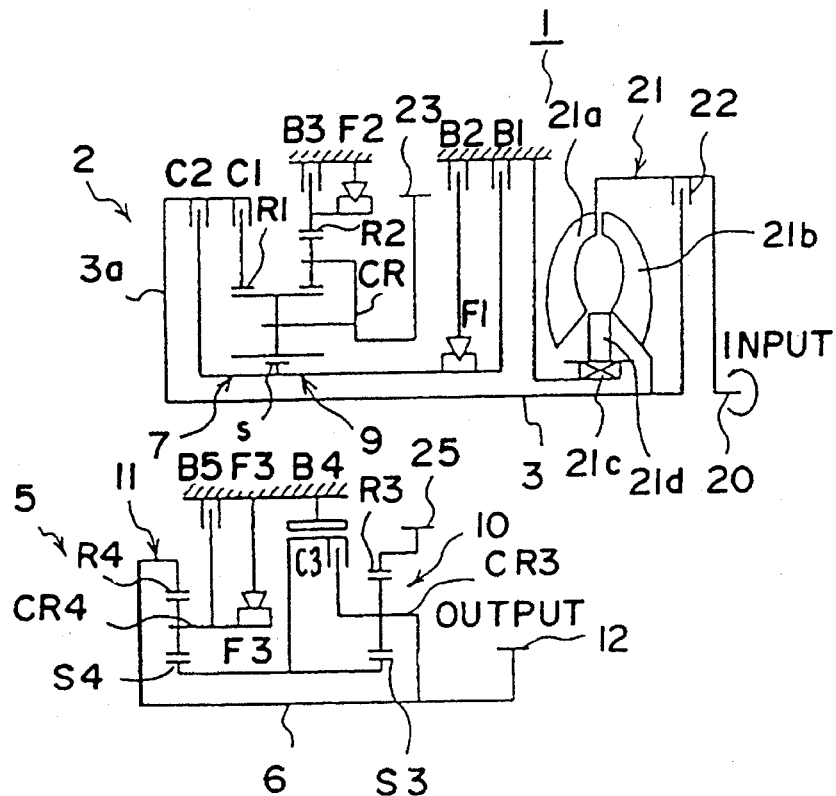
FIG. 3 is a schematic diagram of a five-speed automatic transmission according to the present invention.
FIG. 4 is a chart tabulating the operations of frictional engagement elements of the five-speed automatic transmission.

FIG. 3 schematically shows a five-speed automatic transmission according to the present invention, generally designated at 1. This five-speed automatic transmission 1 is identical to the aforementioned four-speed automatic transmission in its main transmission mechanism 2 but is partially different in its auxiliary transmission mechanism 5. This auxiliary transmission mechanism 5 is identical to the foregoing auxiliary transmission mechanism 5' in the construction of the first single planetary gear set 10, the UD direct clutch C3 and the fourth brake B4 but is different in the addiitonal provision of a second single planetary gear set 11 and a fifth brake B5 and in the different operation of the third one-way clutch F3.

Specifically, the auxiliary transmission mechanism 5 includes first and second single planetary gear sets 10 and 11 wherein the ring gear R3 of the first single planetary gear set and a ring gear R4 of the second single planetary gear set are connected to each other and the sun gears S3 and S4 are integrally connected to provide a Simpson type gear train. Like the foregoing auxiliary transmission mechanism 5', the ring gear R3 of the first single planetary gear set is connected to the counter driven gear 25 to form an input portion, and the carrier CR3 of the first single planetary gear set is connected to the output gear 12. UD direct clutch C3 is interposed between the ring gear R3 of the first single planetary gear set and the integrated sun gears S3 and S4. Moreover, the integrated sun gear S3 (or S4) can be braked by the fourth brake B4, and a carrier CR4 of the second single planetary gear set can be suitably braked by the third one-way clutch F3 and the fifth brake B5. As a result, the auxiliary transmission mechanism 5' can establish gear stages of three forward speeds.

Here will be described the operations of the present five-speed automatic transmission 1 with reference to the chart of FIG. 4. In the first (1ST) speed, the forward clutch C1, the second one-way clutch F2 and the third one-way clutch F3 are engaged. As a result, the main transmission mechanism 5 is decelerated as in 1st-speed, with the decelerated rotation transmitted through the counter gears 23 and 25 to the ring gear R3 of the UD planetary gear set in the auxiliary transmission mechanism 5. This auxiliary transmission mechanism 5 is brought into the 1st-speed state because the ring carrier CR4 of the second single planetary gear set is stopped by the third one-way clutch F3, so that the decelerated rotation of the main transmission mechanism 2 is further decelerated by the auxiliary transmission mechanism 5 and output from the output gear 12.

In second (2ND) speed, not only the forward clutch C1 but also the second brake B2 are engaged so that engagement of the second one-way clutch F2 is smoothly switched to the first one-way clutch F1 to bring the main transmission mechanism 2 into the 2nd-speed state as before. On the other hand, the auxiliary transmission mechanism 5 is in 1st-speed due to engagement of the third one-way clutch F3. This 2nd-speed of the main unit and 1st-speed of the auxiliary unit are combined to establish 2nd speed for the whole of automatic transmission 1.

In third (3RD) speed, the main transmission mechanism 2 is as in the aforementioned 2nd-speed state in which the forward clutch C1, the second brake B2 and the first one-way clutch F1 are engaged, and the auxiliary transmission mechanism 5 has its fourth brake B4 engaged. Then, the sun gears S3 and S4 of the second single planetary gear set are fixed so that the rotation from the ring gear R3 of the first single planetary gear set is output as the 2nd-speed rotation from the carrier CR3. As a result, the 2nd speed of the main transmission mechanism 2 and the 2nd speed of the auxiliary transmission mechanism 5 together establish 3rd speed for the whole automatic transmission 1.

In fourth (4TH) speed, the main transmission mechanism 2 is as in the aforementioned 2nd and 3rd speeds, in which the forward clutch C1, the second brake B2 and the first one-way clutch F1 are engaged, and the auxiliary transmission mechanism 5 has its fourth brake B4 released but its UD direct clutch C3 is engaged. In this state, the first single planetary gear set has its ring gear R3 and its sun gears S4 and S3 connected to establish direct drive, in which the planetary gear sets 10 and 11 are integrally rotated. As a result, the 2nd speed of the main transmission mechanism 2 and the direct drive (or the 3rd speed) of the auxiliary transmission mechanism 5 are combined so that the whole automatic transmission outputs 4th-speed rotation from the output gear 12.

In fifth (5TH) speed, the forward clutch C1 and the direct clutch C2 are engaged, so that rotation of the input shaft 3 is transmitted to both the ring gear R1 and the sun gear S of the single planetary gear set so that the main transmission mechanism 2 is in a direct drive state in which the gear unit is integrally rotated. Likewise, the auxiliary transmission mechanism 5 is in the direct drive state in which the UD direct clutch C3 is engaged. As a result, the third speed, i.e., direct drive, of the main transmission mechanism 2 and the third speed, i.e., direct drive, of he auxiliary transmission mechanism 5 are combined so that the whole automatic transmission outputs 5the -speed rotation from the output gear 12.

In reverse (REV), the direct clutch C2, the third brake B3 and the fifth brake B5 are engaged. In this state, reverse rotation is output as before from the main transmission mechanism 2. On the other hand, the auxiliary transmission mechanism 5 is maintained in the first-speed state because the carrier CR4 of the second single planetary gear set is braked against reverse rotation by the fifth brake B5. As a result, the reverse rotation of the main transmission mechanism 2 and the 1st-speed rotation of the auxiliary transmission mechanism 5 combine to output decelerated reverse rotation from the output shaft 12.

In FIG. 4, the elements indicated by broken circles are engaged for engine braking, as in FIG. 2. Specifically, in 1st speed, the third brake B3 and the fifth brake B5 are engaged to fix the ring gear R2 of the dual planetary gear set instead of the second one-way clutch F2 and to fix the carrier CR4 of the second single planetary gear set instead of the third one-way clutch F3. In 2nd speed, the first brake B1 and the fifth brake B5 are engaged to fix the sun gear S instead of the first one-way clutch F1 and to fix the carrier CR4 of the second single planetary gear set instead of the third one-way clutch F3. In the 3rd and 4th speeds, the first brake B1 is engaged to fix the sun gear S instead of the first one-way clutch F1.

Figure 5:
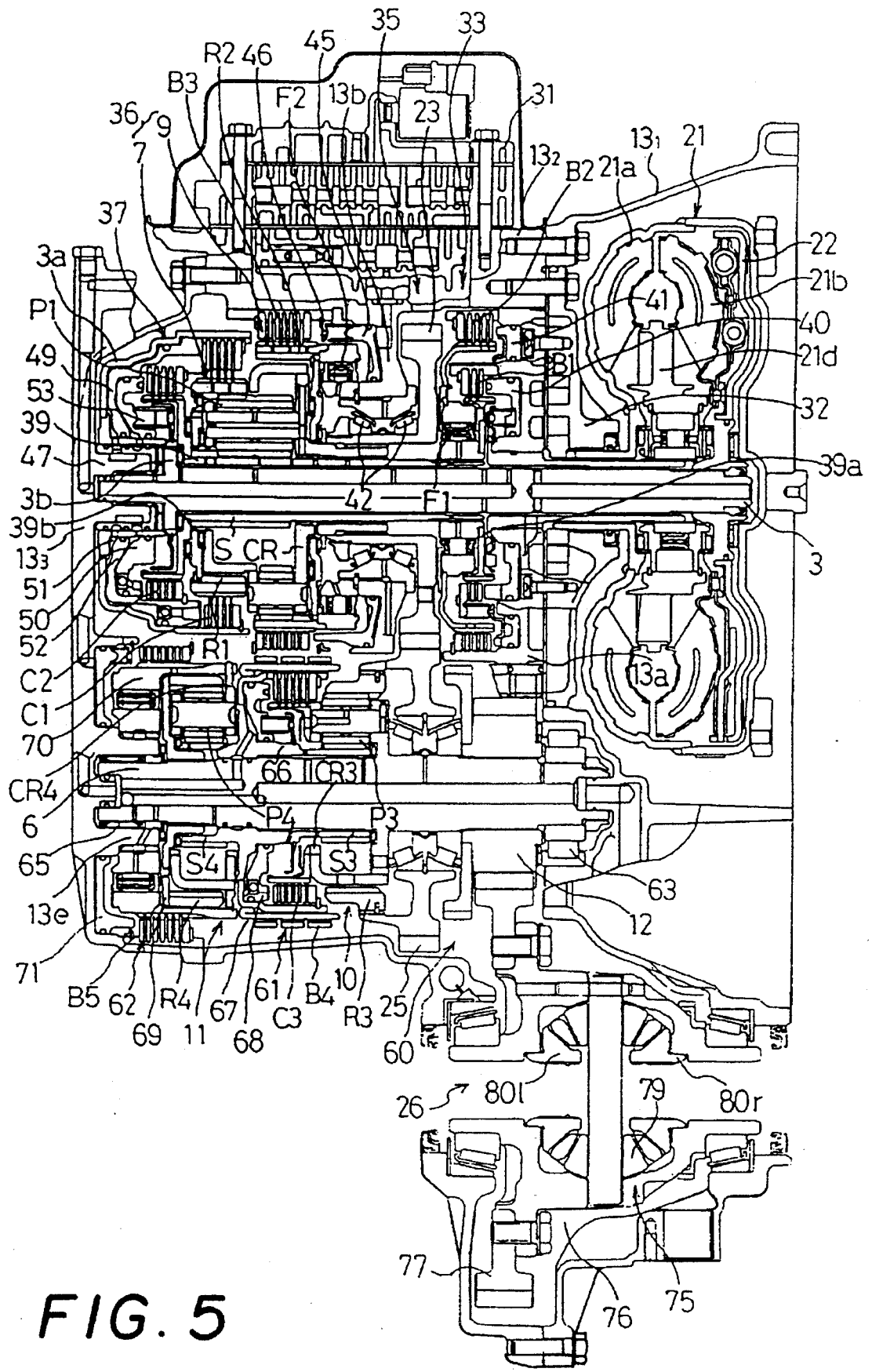
FIG. 5 is a sectional view of an embodiment of a five-speed automatic transmission according to the present invention.

FIG. 5 shows a five-speed automatic transmission i which includes a torque converter 21, three-speed main transmission mechanism 2, three-speed auxiliary transmission mechanism 5 and a differential 26. These components are accommodated in an integral casing which is constructed by joining a transaxle housing $13_1$, a transaxle casing $13_2$ and a transaxle rear cover $13_3$ to one another. The torque converter 21 includes impeller 21a, turbine 21b, stator 21d and lockup clutch 22 so that it can transmit the rotation of the engine clutch shaft to the main transmission mechanism 2, either fluidically through the torque converter 21 or mechanically by engagement of the lockup clutch 22. Casings 13 rotatably support the first shaft 3, which is aligned with the crankshaft, and the second shaft 6 which is arranged in parallel with the first shaft 3. A valve body 31 is mounted on the exterior of the casings 13, and an oil pump 32 is interposed between the main transmission mechanism 2 and the torque converter 21.

The main transmission mechanism 2 has a brake portion 33, an output portion 35, a planetary gear unit portion 36 and a clutch portion 37 axially arranged consecutively in the recited order, from the oil pump 32 to the outside. A hollow shaft 39 is rotatably supported on the first shaft 3.

The planetary gear unit portion 36 includes the single planetary gear set 7 and the dual planetary gear set 9. The single planetary gear set 7 is composed of the sun gear S formed as a long gear on the hollow shaft 39, the ring gear R1, and the carrier CR supporting a long pinion P1 meshing with those gears. The dual planetary gear set 9 is composed of the common sun gear S formed on the hollow shaft 39, the ring gear R2, and the common carrier CR, with the pinion P1 serving as a common pinion meshing the sun gear S and a pinion P2 meshing with the ring gear R2. This, the two planetary gear sets 7 and 9 share in common a sun gear S formed on the hollow shaft 39. The carriers CR are integrated to act as a common carrier, and the pinion P1 is a long pinion.

The brake portion 33 has the first one-way clutch F1, the first brake B1 and the second brake B2 arranged consecutively radially outward in the recited order. Hydraulic servos 40 and 41 are positioned adjacent to the individual brakes and are formed in a casing 3a integrally joined to the casing of the oil pump 32. The first brake B1 is interposed between a flanged portion 39a at the leading end of he hollow shaft 39 and a flanged portion extending from the pump casting 13a. The second brake B2 is interposed between the flanged portion extending from the outer race of the first one-way clutch F1 and the flanged portion extending from the pump casing 13a. The first one-way clutch F1 is arranged between the hollow shaft 39 and the first brake B1.

The output portion 35 includes the counter drive gear 23 which is supported by a bearing 42 on a partition 13b formed in the axle casing $13_2$. The drive gear 23 is splined to the carrier CR. The bearing 42 has its outer race fixed on the partition 13b and has an axial extension, and the second one-way clutch F2 is interposed between that axial extension and a member integrated with the ring gear R2. The third brake B3 is interposed between the outer circumference of the ring gear R2 and the axle casing $13_2$. At one side wall of the partition 13b, there is arranged a hydraulic servo 45 which has its piston axially extended into a comb-tooth shape to control the third brake B3. A return spring 46 is arranged at the comb-tooth portion.

The clutch portion 37 includes the forward clutch C1 and the direct clutch C2 and is accommodated in the transaxle rear cover $13_3$ which is positioned at the leading end of the main transmission mechanism 2 and forms a portion of the integral casing. A flanged portion 3a is integrally connected to the leading end portion of the first shaft 3 and mates with a boss portion 47 of the cover $13_3$. On the flanged portion 3a, there is fitted a piston member 49, defining an annular cylinder in which is fitted a piston member 50. Moreover, the piston member 49 defines an oil chamber 51, in conjunction with the flanged portion 3a, and engages flanged portion 3a to prevent relative rotation therebetween. Piston member 49 serves as a hydraul8ic servo for the forward clutch C1. The piston portion 50 on one side forms an oil chamber 52 between itself and the movable member 49 and, on the other side, contacts direct clutch C2 to serve as a hydraulic servo for the direct posed between the axially extending rim of the flanged portion 3a and the outer circumference of the ring gear R1 of the single planetary gear set, whereas the direct clutch C2 is interposed between the inner circumference of the piston member 49 and a flanged portion 39b connected to the leading end of the hollow shaft 39.

The auxiliary transmission mechanism 5 includes a gear portion 60, the first single planetary gear set 10, a control portion the second single planetary gear set 11 and an additional control portion 62 arranged consecutively, in the recited order, axially along the second shaft 6. The second shaft 6 is rotatably supported in the casings $13_2$ and $13_3$ by bearings 63 and 65.

The gear portion 60 is composed of the differential drive pinion (or the output gear) 12 splined to the second shaft 6 for transmitting rotation to the differential 26, and the counter driven gear 25 rotatably supported on the shaft 6 through a bearing and meshing with the aforementioned counter drive gear 23.

The first single planetary gear set 10 has its ring gear R3 connected to the counter driven gear 25, and a sleeve 66 formed with the sun gear S3 is rotatably supported by the second shaft 6. Pinion P3 is supported by the carrier CR3 which has a flange formed integrally with the second shaft 6, and the portion of carrier CR3 supporting the other end of the pinion P3 is connected to the inner hub of the UD direct clutch C3.

The control portion 61 has, arranged around its periphery, the fourth brake B4 in the form of a band brake having a drum 67 engageable at its radially inner surface by the UD direct clutch C3. Moreover, the aforementioned sun gear sleeve 66 forms the cylinder of a hydraulic servo 68 for the direct clutch C3 and has the outer hub of the drum 67 fixed to the clutch C3.

The second single planetary gear set 11 has its sun gear S4 formed on the aforementioned sleeve 66 and its ring gear R4 connected to a flange 69 which is splined to the second shaft 6. The carrier CR4 supporting a pinion P4 is connected to an axial extension of drum 70.

The additional control unit 61 includes the fifth brake B5 and, radially inward of the brake B5, the third one-way clutch F3. The additional control unit 61 is housed together with the second single planetary gear set 11 in the axle rear cover $13_3$. This rear cover $13_3$ includes a cylindrical portion having an inner surface splined to the fifth brake B5 which is arranged between that inner surface and the outer surface of the aforementioned drum 70. The rear cover $13_3$ also has a flanged portion 13e which supports the second shaft 6 and which forms, in conjunction with the cylindrical portion of rear cover 13e, the cylinder of hydraulic servo 71 for the fifth brake B5. The third one-way clutch F3 is arranged between the flanged portion 13e and the drum 70.

The differential 26 includes a differential gear unit 75 and a ring gear mounting casing 76. Ring gear 77 is fixed to mounting casing 76, meshes with the aforementioned differential drive gear 12 and supports a differential pinion 79 of the differential gear unit 75 to serve as a differential carrier. The differential gear unit 75 has left-hand and right-hand side gears 80l and 80r, meshing with that pinion 79 and coupled to the left-hand and right-hand front axles, respectively.

Figure 6:
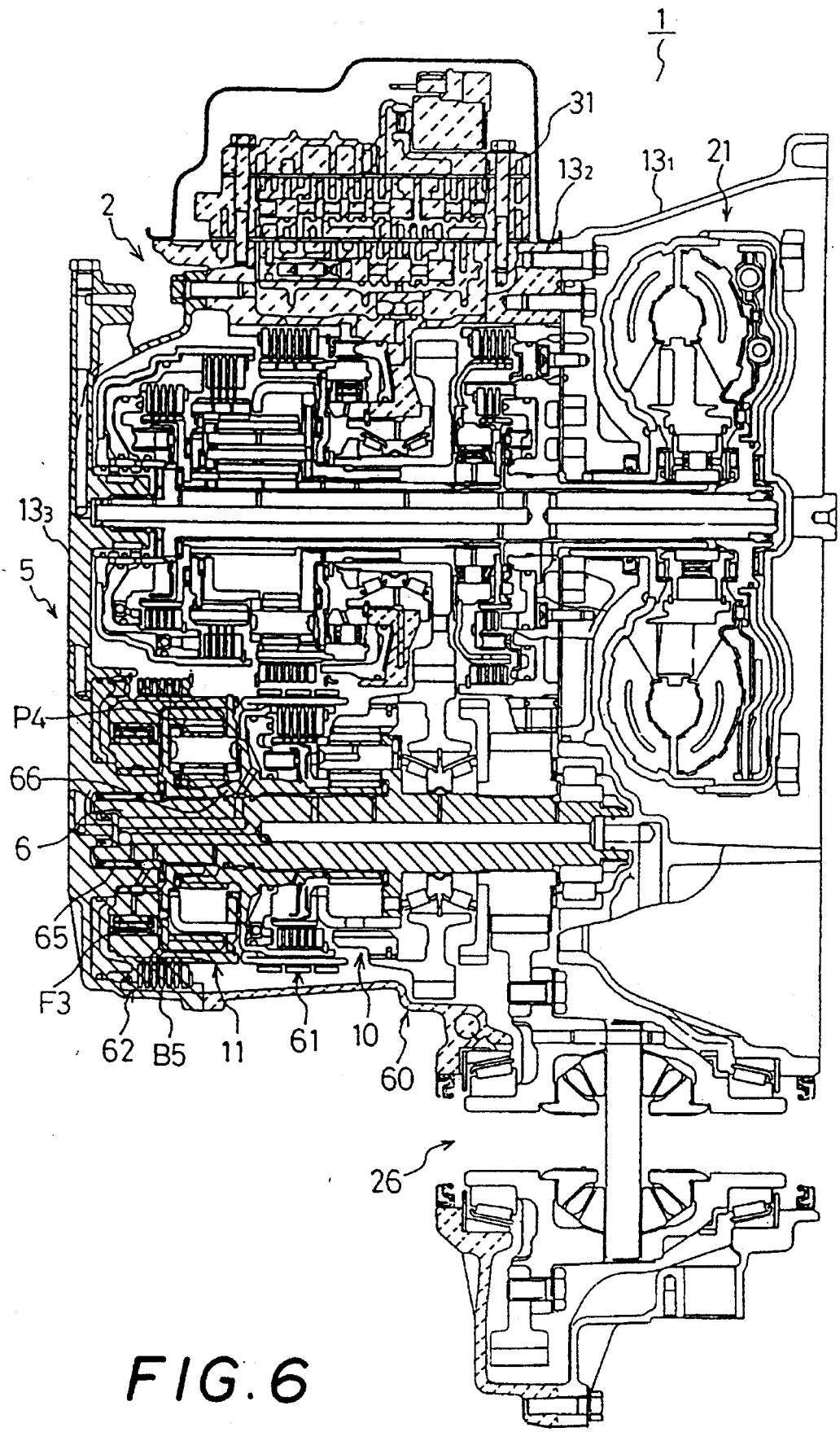
FIG. 6 is a sectional view with shaded portions to illustrate components of the five-speed automatic transmission of FIG. 5 which have been added in accordance with the present invention.

In the aforementioned four-speed automatic transmission 1', the portions shown hatched with solid lines in FIG. 6, are new to the present invention, and the portions shown hatched with broken lines, are modified (improved) in accordance with the present invention. Specifically, the transaxle rear cover $13_3$, the second shaft 6, the additional control portion 62 (i.e., the fifth brake B5 and the third one-way clutch F3) and the sun gear sleeve 66 are new, and the valve body 31 and the transaxle casing $13_2$ are added and modified. Incidentally, in the second planetary gear set 11, the pinion P4 is exemplified by a conventional part, and the bearing 65 used to support the second shaft is exemplified by a conventional part.

The other portions (i.e., the portions having no hatching in FIG. 6), including the torque converter 21, the main transmission mechanism 2, the transaxle housing $13_1$, the differential portion 26, the first single planetary gear set 10, the gear portion 60 and the control portion 61 of the auxiliary transmission mechanism are interchangeable with the four-speed automatic transmission 1'.

In the above-described embodiment, the rotation of the engine crankshaft is transmitted through the torque converter 21 or the lockup clutch 2 to the first shaft 3 and is changed in speed by the main transmission mechanism 2 and the speed-changed rotation is transmitted through the counter drive gear 23 and the counter driven gear 25 to the auxiliary transmission mechanism 5. The rotation is further suitably changed in speed by the auxiliary transmission mechanism 5 and is transmitted through the differential 26 to the right-hand and left-hand axles. The individual frictional engagement elements C1, C2, B1, B2, B3, F1 and F2 of the main transmission mechanism 2, and the individual frictional engagement elements C3, B4, B5 and F3 of the auxiliary transmission mechanism 5 are either engaged or disengaged as tabulated in FIG. 4. Incidentally, solid circles appearing in FIG. 4 indicate engagement whereas the broken circles indicate coasting (engine braking). The 1st speed of the main transmission mechanism 2 and the 1st speed of the auxiliary transmission mechanism 5 are combined to establish 1st speed for the whole transmission 1, and the 2nd speed of the main transmission mechanism 2 and the 1st speed of the main transmission mechanism 5 are combined to establish 2nd speed for the whole transmission 1. Moreover, the 2nd speed of the main transmission mechanism 2 and the 2nd speed of the auxiliary transmission mechanism 5 are combined to establish 3rd speed overall, and the 2nd speed of the main transmission mechanism 2 and the 3rd speed of the auxiliary transmission mechanism 5 are combined to establish the 4th speed overall. The 3rd speed of the main transmission mechanism 2 and the 3rd speed of the auxiliary transmission mechanism 5 are combined to establish the 5th speed overall.

It is to be noted that the present invention is not limited to the embodiment described above. A variety of changes and modifications are feasible in keeping with the spirit of the present invention. Such changes and modifications should not be excluded from the scope of the present invention.

What is claimed is:

1. An automatic transmission, providing five forward speeds and one reverse speed, comprising:

a casing;

first and second parallel transmission shafts rotatably mounted within said casing;

a fluid coupling for transmitting engine power to said first shaft and a housing for said fluid coupling joined to said casing to form an integral casing unit;

a main transmission mechanism mounted within said casing, coaxially with said fluid coupling on said first shaft, said main transmission mechanism providing three forward speeds and one reverse speed and including:

a planetary gear train coupled to said fluid coupling; and an output unit connecting said planetary gear train and arranged between said planetary gear train and said fluid coupling;

an auxiliary transmission mechanism mounted within said casing on said second shaft, said auxiliary transmission mechanism providing three forward speeds and including:

a hollow output shaft mounted on said second shaft;

a band brake which is engaged at 2nd speed of said auxiliary transmission mechanism;

a multi-disc clutch which is engaged at 3rd speed of said auxiliary transmission mechanism and a first hydraulic servo for said multi-disc clutch including a first cylinder and a piston slidably mounted in said first cylinder, said multi-disc clutch and said first hydraulic servo being connected to said integral casing through said band brake, said band brake being arranged around the outer circumference of said first hydraulic servo;

a multi-disc brake which is engaged at 1st speed of said auxiliary transmission mechanism and a second hydraulic servo for said multi-disc brake including a second cylinder and a piston slidably mounted in said second cylinder;

a first planetary gear set comprising a first ring gear, connected to the output unit of said main transmission mechanism and serving as an input unit for said auxiliary transmission mechanism, a first carrier connected to said output shaft and a first sun gear engageable with said first carrier through said multi-disc clutch and said first hydraulic servo; and a second planetary gear set comprising a second ring gear connected to said output shaft, a second carrier engageable with said integral casing through said multi-disc clutch and a second sun gear connected to said first sun gear through said hydraulic servo for said multi-disc clutch.

2. An automatic transmission according to claim 1, wherein said main transmission mechanism further includes:

a hollow input shaft mounted on and concentric with said first shaft;

a plurality of frictional elements comprising:
        a first clutch which is engaged in 1st speed of said main transmission mechanism;
        a first brake which engaged in 2nd speed of said main transmission mechanism;
        a second clutch which is engaged in 3rd speed and in reverse speed of said main transmission mechanism; and
        a second brake which is engaged in reverse speed of said main transmission mechanism; and wherein said planetary gear train comprises:

a third planetary gear set comprising:
        a ring gear connected to said input shaft through said first clutch;
        a third carrier connected to said output unit; and
        a third sun gear connected to said input shaft through said second clutch and connected to said integral casing unit through said first brake; and a dual planetary gear set comprising:
        a fourth ring gear connected to said integral casing unit through said second brake;
        a fourth carrier integrally connected to said third carrier; and
        a fourth sun gear integrally connected to said third sun gear.

3. An automatic transmission according to claim 1, wherein said auxiliary transmission mechanism further includes:

a first one-way clutch which is engaged at 1st speed of said auxiliary transmission mechanism to connect said second planetary gear set and the cylinder of said second hydraulic servo, and wherein said second carrier is connected to said integral casing unit through said first one-way clutch.

4. An automatic transmission according to claim 2, wherein said plurality of frictional engagement elements of said main transmission mechanism further comprises:

a third brake and a second one-way clutch which are engaged at 2nd speed of said main transmission mechanism, said third brake connecting said sun gear to said integral casing unit and said second one-way clutch being interposed between said third sun gear and said first brake, and connecting said fourth ring gear to said integral casing unit through said second one-way clutch; and a third one-way clutch F engaged at 1st speed of said main transmission mechanism.

5. An automatic transmission according to claim 1, wherein said integral casing unit comprises said casing, said housing and a rear cover integrally joined to said casing and wherein said rear cover forms at least a portion of said second cylinder of said second hydraulic servo.

6. An automatic transmission according to claim 1, wherein said first sun gear, said second sun gear and said first cylinder of said first hydraulic servo are integrally formed on said hollow output shaft.

* * * * *

UNITED STATES PATENT AND TRADEMARK OFFICE
CERTIFICATE OF CORRECTION

PATENT NO.   : 5,470,284
DATED        : November 28, 1995
INVENTOR(S)  : TANIGUCHI et al It is certified that error appears in the above-indentified patent and that said Letters Patent is hereby corrected as shown below:

Col. 1, line 31, " U.S. Pat" should read --U.S.P.--.

Col. 7, line 63, "5the" should read --5th--.

Col. 8, line 22, "transmission i" should read

--transmission 1--.

Col. 9, line 35, after "direct" insert --"clutch. A return spring 53 is arranged between the piston member 50 and a ring 3b fixed on the first shaft 3. The return spring 53, which is under compression, is shared by the piston members 49 and 50 of the two hydraulic servos. The forward clutch C1 is inter-" --.

Signed and Sealed this

Eighth Day of October, 1996

Attest:

BRUCE LEHMAN

Attesting Officer

Commissioner of Patents and Trademarks